United States Patent [19]

Hasuo et al.

[11] 4,305,920
[45] Dec. 15, 1981

[54] PROCESS FOR PRODUCING SOLID TITANIUM TRICHLORIDE

[75] Inventors: Masayoshi Hasuo; Yoshinori Suga, both of Yokohama; Yoshiteru Kobayashi, Kawasaki; Kazuhisa Kojima, Yokohama; Masatoshi Suzuki, Fujisawa, all of Japan

[73] Assignee: Mitsubishi Chemical Industries, Ltd., Tokyo, Japan

[21] Appl. No.: 117,006

[22] Filed: Jan. 30, 1980

[30] Foreign Application Priority Data

Mar. 1, 1979 [JP] Japan .................................. 54-23983

[51] Int. Cl.³ ............................................. C01G 23/02
[52] U.S. Cl. .............................. 423/492; 252/429 A; 585/524
[58] Field of Search .................... 423/492; 252/429 A

[56] References Cited

U.S. PATENT DOCUMENTS 3,146,224  8/1964  Coover et al. ....................... 423/492
3,280,093  10/1966  Coover et al. ...................... 423/492
3,558,271  1/1971  Calcagno ............................ 423/492
4,048,415  9/1977  Matsuzawa et al. ............ 252/429 A
4,115,533  9/1978  Yamaguchi et al. ................ 423/492
4,154,699  5/1979  Tamm et al. .................... 252/429 A
4,195,069  3/1980  Kortbeek et al. ................... 423/492

FOREIGN PATENT DOCUMENTS 2716847  12/1977  Fed. Rep. of Germany ....... 423/492
52-91794  8/1977  Japan .

*Primary Examiner*—Herbert T. Carter
*Attorney, Agent, or Firm*—Oblon, Fisher, Spivak, McClelland & Maier

[57] ABSTRACT

A fine solid titanium trichloride is used as a catalyst for a polymerization of an α-olefin. The solid titanium trichloride is produced by precipitating it at lower than 150° C. from a liquid titanium trichloride complex in the presence of an ester having the formula

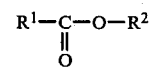

wherein $R^1$ and $R^2$ respectively represent a hydrocarbon moiety and total carbon atoms of $R^1$ and $R^2$ are 10 or more.

3 Claims, No Drawings

PROCESS FOR PRODUCING SOLID TITANIUM TRICHLORIDE

BACKGROUND OF THE INVENTION

1. Field of the Invention

The present invention relates to a process for producing a solid titanium trichloride. More particularly, it relates to a process for producing a solid titanium trichloride which is useful as a catalytic component for a polymerization of an α-olefin.

2. Description of the Prior Arts

It has been known that a fine solid titanium trichloride obtained by heat-treating, at lower than 150° C. a liquid titanium trichloride complex obtained by solubilizing it in the presence of an ether, is used as a catalyst for a polymerization of an α-olefin.

It has been also known that in the production of the catalyst, the precipitation of the fine solid titanium trichloride from the liquid titanium trichloride complex is carried out in the presence of an electron donor such as esters and phosphites to obtain a catalyst which can produce a polymer having high isotactic characteristic.

The inventors have further studied to improve the production of the catalyst.

SUMMARY OF THE INVENTION

It is an object of the present invention to provide a process for producing a fine solid titanium trichloride as a catalyst which has an improved polymerization efficiency and produces a polymer having high isotactic characteristic by precipitating it from a liquid titanium trichloride complex in the presence of a specific high molecular weight carboxylic acid ester.

The foregoing and other objects of the present invention have been attained by providing a process for producing a fine solid titanium trichloride by precipitating it at lower than 150° C. from the liquid titanium trichloride complex in the presence of an ester having the formula

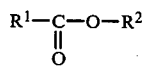

wherein $R^1$ and $R^2$ respectively represent a hydrocarbon moiety and total carbon atoms of $R^1$ and $R^2$ are 10 or more.

DETAILED DESCRIPTION OF THE PREFERRED EMBODIMENTS

The ethers used for the preparation of the liquid titanium trichloride complex can be ethers which are soluble to a hydrocarbon solvent and usually have the formula

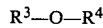

wherein $R^3$ and $R^4$ are the same or different and respectively represent hydrocarbon moiety and suitable $R^3$ and $R^4$ include alkyl groups preferably straight chain alkyl groups such as ethyl, n-propyl, n-butyl, n-amyl, n-hexyl, n-heptyl, n-octyl, n-decyl, and n-dodecyl group; alkenyl groups preferably straight chain alkenyl groups such as butenyl, octenyl and decenyl groups; aryl groups such as tolyl, xylyl and ethyl phenyl; and aralkyl groups such as benzyl group.

Dialkyl ethers, dialkenyl ethers and alkyl alkenyl ethers are preferably used.

Suitable ethers include diethyl ether, di-n-propyl ether, di-n-butyl ether, di-n-amyl ether, di-n-hexyl ether, di-n-heptyl ether, di-n-octyl ether, di-n-decyl ether, di-n-dodecyl ether, n-amyl-n-butyl ether, n-butyl-n-octyl ether, n-propyl-n-hexyl ether, bis(1-butenyl) ether, bis(1-octenyl) ether and propyl-1-butenyl ether.

The processes for producing the liquid titanium trichloride complex in the presence of the ether can be usually classified to the following two processes.

(A) A process for reducing titanium tetrachloride as a starting material with an organoaluminum compound in the presence of an ether and if necessary, a desired solvent.

(B) A process for treating a solid titanium trichloride as the starting material with an ether in the presence of a desired solvent.

The process (A) will be described in detail.

The organoaluminum compounds used for the reduction can be compounds having the formula

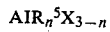

wherein $R^5$ represents a $C_1$-$C_{20}$ hydrocarbon moiety; n is an integer of 1 to 3; and X represents a halogen atom; preferably $R^5$ is a $C_1$-$C_{10}$ alkyl group such as methyl, ethyl, propyl, butyl, pentyl, hexyl and octyl groups.

Suitable organoaluminum compounds include trialkylaluminums such as triethylaluminum, tripropylaluminum and tributylaluminum; dialkylaluminum monohalides such as dimethylaluminum monochloride, diethylaluminum monochloride, dipropylaluminum monochloride and diethylaluminum monobromide; alkylaluminum sesquihalides such as ethylaluminum sesquichloride; and alkylaluminum dihalides such as methylaluminum dichloride and ethylaluminum dichloride.

The process (A) for the production of the liquid titanium trichloride complex will be further illustrated.

(a) A process for adding an organoaluminum compound to a homogeneous liquid of titanium tetrachloride and an ether or a process for admixing them in the opposite order.

(b) A process for adding a homogeneous liquid of an organoaluminum compound and an ether to titanium tetrachloride or a process for admixing them in the opposite order.

(c) A process for adding a homogeneous liquid of an organoaluminum compound and an ether to a homogeneous liquid of titanium tetrachloride and an ether or a process for admixing them in the opposite order.

(d) A process for elevating a temperature to a desired temperature after admixing them in the orders (a) to (c) at lower than −30° C.

The temperature in the treatment is usually in a range of −30° C. to 35° C. preferably 0° C. to 35° C. In the amounts of the components, a molar ratio of Ti component in titanium tetrachloride; the hydrocarbon moiety ($R^5$ in the formula) of the organoaluminum compound is in a range of 1:0.1 to 1:50 preferably 1:0.3 to 1:10 and a molar ratio of the ether:titanium tetrachloride is in a range of 1:0.05 to 1:5 preferably 1:0.25 to 1:2.5.

In the production of the liquid product, it is preferable to incorporate more than 2 times of a desired solvent such as hydrocarbon or halogenated hydrocarbon solvents based on the ether after a preparation of the liqud product.

Suitable hydrocarbon solvents include saturated aliphatic hydrocarbons such as n-pentane, n-hexane, n-heptane, n-octane, n-dodecane and liquid paraffin; alicyclic hydrocarbons such as cyclohexane and methyl cyclohexane; and aromatic hydrocarbons such as benzene and toluene and xylene.

Suitable halogenated hydrocarbon solvents include chlorobenzene, bromobenzene, o-, m- or p- dichlorobenzenes. In particular, the solvent is mainly selected depending upon a kind of the ether used in the process. For example, a halogenated hydrocarbon solvent or a mixture of a halogenated hydrocarbon solvent and a hydrocarbon solvent is selected when diethyl ether is used. An aromatic hydrocarbon solvent is preferably selected or an alicyclic hydrocarbon solvent is also selected when an ether having the formula wherein at least one of $R^3$ and $R^4$ is a $C_3$-$C_5$ alkyl or alkenyl group. A saturated aliphatic hydrocarbon solvent is preferably selected when an ether having the formula wherein $R^3$ and $R^4$ are an alkyl or alkenyl group having 6 or more carbon atoms.

It is possible to incorporate a small amount of titanium tetrabromide or titanium tetraiodide in the reduction of titanium tetrachloride with an organoaluminum compound in the presence of an ether.

The process (B) will be illustrated in detail.

The solid titanium trichloride can be obtained by reducing titanium tetrachloride with hydrogen gas, aluminum or an organoaluminum compound or pulverizing the resulting solid titanium trichloride by a ball mill.

When the solid titanium trichloride is treated with an ether, it is possible to mix them in a desired method.

In the treatment, it is also preferable as the process (A), to incorporate more than 2 times of a desired solvent such as the hydrocarbon or halogenated hydrocarbon solvents based on the ether. The hydrocarbon or halogenated hydrocarbon solvents can be the same as described above and can be selected depending upon a kind of the ether used.

In the amounts of the components, a molar ratio of the ether; titanium trichloride is 1 or more preferably in a range of 1 to 5.

The resulting liquid product is a homogeneous solution or mixture of a titanium trichloride ether complex which is soluble to hydrocarbons wherein the titanium trichloride is produced by a reduction of titanium tetrachloride. The liquid product is a brown or greenish brown liquid which may contain a small amount of a solid component sometimes.

The process of the present invention is characterized in that the precipitation of the product from the resulting liquid titanium trichloride complex is carried out at lower than 150° C. in the presence of an ester compound having the formula

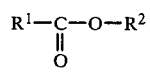

wherein $R^1$ and $R^2$ respectively represent hydrocarbon moiety and total carbon atoms are preferably 12 or more such as $C_1$-$C_{50}$ saturated or unsaturated aliphatic hydrocarbon moiety; $C_6$-$C_{50}$ aromatic hydrocarbon moiety or $C_5$-$C_{50}$ alicyclic hydrocarbon moiety and total carbon atoms are preferably 12 or more preferably 12 to 50.

Suitable ester compounds include aromatic carboxylic acid esters such as butyl benzoate, amyl benzoate, hexyl benzoate, octyl benzoate, decyl benzoate, phenyl benzoate, hexyl toluylate, octyl toluylate, decyl toluylate, phenyl toluylate, butyl ethylbenzoate, amyl ethylbenzoate, hexyl ethylbenzoate, octyl ethylbenzoate, decyl ethylbenzoate, phenyl ethylbenzoate, butyl trimethylbenzoate, amyl trimethylbenzoate, hexyl trimethylbenzoate, octyl trimethylbenzoate, decyl trimethylbenzoate, phenyl trimethylbenzoate, propyl propylbenzoate, butyl propylbenzoate, amyl propylbenzoate, hexyl propylbenzoate, octyl propylbenzoate, decyl propylbenzoate, and phenyl propylbenzoate; saturated aliphatic carboxylic acid esters such as octyl butyrate, decyl butyrate, hexyl valerianate, octyl valerianate, decyl valerianate, phenyl valerianate, amyl caproate, hexyl caproate, octyl caproate, decyl caproate, phenyl caproate, propyl caprylate, butyl caprylate, amyl caprylate, hexyl caprylate, octyl caprylate, phenyl caprylate, propyl caprate, butyl caprate, amyl caprate, hexyl caprate, octyl caprate, decyl caprate, phenyl caprate, propyl laurate, butyl laurate, amyl laurate, hexyl laurate, octyl laurate, phenyl laurate, propyl palmitate, butyl palmitate, hexyl palmitate, octyl palmitate, phenyl palmitate, ethyl stearate, propyl stearate, butyl stearate, hexyl stearate, octyl stearate and phenyl stearate; unsaturated aliphatic carboxylic acid esters such as octyl crotonate, octyl methacrylate, ethyl oleate, butyl oleate, hexyl oleate, octyl oleate and phenyl oleate. The optimum esters include octyl benzoate, decyl benzoate, butyl caprate, decyl caprate, butyl stearate, hexyl stearate, butyl oleate and hexyl oleate.

The ester compound can be added at any step before a completion of the precipitation of the fine solid titanium trichloride. It is preferable to add the ester compound before the precipitation or at an initial stage of the precipitation so that the ester compound is substantially presence during the precipitation of the solid titanium trichloride.

In the method of the addition of the ester compound, the ester compound itself can be added or can be diluted with a hydrocarbon solvent or a halogenated hydrocarbon solvent before the addition. The amount of the ester compound is usually at a molar ratio of the ester compound to the precipitated titanium trichloride of 0.005 to 0.50 preferably 0.01 to 0.10.

The process for producing the fine solid titanium trichloride by a precipitation at lower than 150° C. from the liquid product is not critical. For example, the precipitation is carried out from the liquid product or a mixture of the liquid product and a hydrocarbon solvent or a halogenated hydrocarbon solvent at lower than 150° C. usually in a range of 20° to 150° C. preferably 40° to 120° C. especially 60° to 100° C.

When total moles of Ti and Al in the liquid titanium trichloride complex are less than the moles of the ether, the precipitation can be accelerated by adding a decomplexing agent.

The decomplexing agent has a function for reacting with the titanium trichloride ether complex to result free of titanium trichloride. Suitable decomplexing agents include Lewis acids having stronger acidity than acidity of titanium trichloride such as titanium tetrachloride, boron trifluoride, boron trichloride, vanadium tetrachloride, aluminum trichloride, alkylaluminum dichloride, alkyl aluminum sesquichloride and dialkylaluminum chloride. It is optimum to use titanium tetrachloride and aluminum chlorides such as aluminum trichloride and alkylaluminum dichlorides. The amount of the decomplexing agent is preferably at a molar ratio of less than 5 based on Ti component in the liquid product.

In accordance with this process, a violet fine solid titanium chloride is obtained from the liquid product. This is considered to precipitate as a free solid titanium trichloride produced by reacting the titanium trichloride ether complex in the liquid product with a decomplexing agent which is already presence in the liquid product (such as excess of titanium tetrachloride) or is newly added.

When the resulting solid titanium trichloride is used for a polymerization of an α-olefin together with the cocatalyst, if the unreacted titanium tetrachloride is remained in the catalyst, a polymerization activity per a solid catalyst decreases. When a slurry polymerization is carried out by using it, the characteristics of the slurry is deteriorated. Thus, it is preferable to wash the resulting solid titanium trichloride with a hydrocarbon solvent. The hydrocarbon solvent used for the washing is not critical as far as it is an inert to the catalyst. It is preferable to be the same as the solvent used in the polymerization. The violet solid titanium trichloride obtained by the process of the present invention may contain a small amount of the ether complex or the added ester compound but it does not substantially contain an aluminum component. A ratio of Al to Ti in the solid titanium trichloride is less than 5 wt. %.

The resulting solid titanium trichloride is useful as a catalytic component for a polymerization of an α-olefin. When the solid titanium trichloride is combined with an organoaluminum compound to use them for the polymerization of an α-olefin, an α-olefin polymer having excellent isotactic index can be obtained at remarkably high polymerization activity.

The polymerization of an α-olefin with the product will be further described.

The organoaluminum compounds used as the cocatalyst can be compounds having the formula $$AlR^6_m Y_{3-m}$$

wherein $R^6$ represents a $C_1$–$C_8$ alkyl group; m is 1 to 3; and Y represents a halogen atom. Suitable organoaluminum compounds include dialkylaluminum chlorides such as diethylaluminum chloride, dimethylaluminum chloride, di-n-propylaluminum chloride, and di-n-hexylaluminum chloride. It is especially preferable to use the compound having the formula wherein $R^6$ is n-propyl or n-hexyl group, Y is a chlorine atom and m is in a range of 1.95 to 2.10 because an α-olefin polymer having remarkably high isotactic index can be obtained at high polymerization activity.

In the polymerization of an α-olefin, it is possible to use an electron donor as the third catalytic component together with the solid titanium trichloride and the cocatalyst. The electron donors can be trialkylphosphites, triarylphosphites and carboxylic acid esters.

In the amounts of the components in the catalyst, a molar ratio of the titanium trichloride; the organoaluminum compound is usually in a range of 1:1 to 100 preferably 1:2 to 40. When the third catalytic component is used, a molar ratio of the titanium trichloride; the third catalytic component is usually in a range of 1:0.01 to 10 preferably 1:0.05 to 2.

Suitable α-olefins used for the polymerization include propylene, butene-1, 4-methylpentene-1. A homopolymerization of the α-olefin, a copolymerization of ethylene and the α-olefin or a copolymerization of two or more of the α-olefins can be carried out.

This is especially preferable for a homopolymerization of propylene, a random copolymerization by using more than 90 wt. % of propylene or a block copolymerization by using more than 80 wt. % of propylene to obtain a polymer having high isotactic index. The polymerization can be carried out in a vapor phase polymerization, or in a slurry polymerization in the presence of a diluent such as pentane, hexane, heptane or liquid propylene. A temperature and a pressure of the polymerization are not critical and the temperature is usually in a range of 30° to 100° C. preferably 50° to 90° C. and the pressure is usually in a range of the atmospheric pressure to about 100 atm. In the polymerization, a known molecular weight regulator such as hydrogen or a halogenated hydrocarbon can be used.

The invention will be further illustrated by certain Examples and References which are provided herein for purpose of illustration only and are not intended to be limiting in any manner unless otherwise specified.

In Examples and References, the catalyst efficiency CE was given by a weight (g.) of polypropylene per 1 g. of Ti in the solid titanium trihalide catalyst. The polymerization activity of the catalyst, K value was given by a weight (g.) of polypropylene per 1 g. of Ti, 1 hour and a propylene pressure of 1 kg./cm² (K=g.-polymer/g.-Ti×hr.×propylene pressure kg./cm²). In the determination of CE value and K value, Ti content was measured by a fluorescent X-ray analysis of a pressed sample obtained from the resulting polymer powder (hereinafter it is referred to as FX analysis). The isotactic index II was measured as a weight ratio of a residue obtained by extracting the polymer with a boiled n-heptane for 6 hours by an improved Soxhlet's extractor (hereinafter it is referred as %). An atactic polymer is soluble to a boiled n-heptane and accordingly, II shows a weight ratio of isotactic polymer. The bulk density $\rho_B$ was measured by Japanese Industrial Standard K-6721 as a weight per unit volume cc which was measured by packing a polymer powder into a 100 cc mescylinder under gravitationally falling and weighing the weight of the polymer.

EXAMPLE 1

In a 1 l. four necked flask which was dried and purged with argon, 200 ml. of toluene, 180 mmol of TiCl$_4$, 90 mmol of di-n-butyl ether were charged and stirred at 25° C. Then, 100 ml. of a solution of 90 mmol of diethylaluminum monochloride and 90 mmol of di-n-butyl ether in toluene was added to the mixture to obtain a brown homogeneous solution. The homogeneous solution was gradually heated. During the heating, a violet solid titanium trichloride was precipitated at higher than about 50° C. When a small amount of the violet solid titanium trichloride was produced, 13.5 mmol of o-octyl benzoate (hereinafter referring to as OB) (OB/TiCl$_4$=0.075) and 3 ml. of toluene were added. The mixture as a catalyst solution system was further heated to 95° C. and was stirred at the same temperature for 90 minutes to produce the violet solid titanium trichloride. The mixture was cooled and the violet solid titanium trichloride was separated by a filtration and was washed five times with 200 ml. of toluene to obtain a slurry of violet solid titanium trichloride. The yield of the product measured by a concentration of the slurry was 31.8 g. According to the analysis, the solid titanium trichloride had the formula TiCl$_3$(n-

Bu₂O)₀.₁₂₄(OB)₀.₀₆₃. A specific surface area of the solid titanium trichloride measured by the BET method was 32 m²/g.

A polymerization of propylene by using the resulting solid titanium trichloride will be described.

In a 2 l. autoclave equipped with an induction magnetic stirrer which was dried and purged with a purified nitrogen, 2.0 mmol of di-n-propylaluminum monochloride as a cocatalyst was charged and then, hydrogen gas was charged to give a pressure of 1.2 kg./cm² (gauge) and 750 g. of a liquefied propylene was charged. When the temperature in the autoclave reached to 65° C., the slurry of the solid titanium trichloride was charged under the pressure of purified nitrogen gas to initiate the polymerization. After 3 hours, the unreacted propylene was purged and the autoclave was cooled to obtain 413 g. of a white powdery polypropylene. According to the FX analysis, the content of Ti in the polymer was 20.1 ppm. Therefore, CE value was 49,750 and K value was 603. The polypropylene had II of 97.2% and $\rho_B$ of 0.41 g./cc.

REFERENCE 1

In accordance with the process of Example 1 except eliminating the addition of n-octyl benzoate, a violet solid titanium trichloride was obtained and a polymerization of propylene was carried out by using the solid titanium trichloride. The result is shown in Table 1.

REFERENCE 2

A polymerization of propylene was carried out by using the solid titanium trichloride obtained in Reference 1 and adding n-octyl benzoate in a polymerization system.

In accordance with the process of Reference 1 except adding n-octyl benzoate at a molar ratio of OB/TiCl₃ of 0.063 (corresponding to the content of OB remained on the solid titanium trichloride in Example 1), a polymerization of propylene was carried out. The result is shown in Table 1.

EXAMPLES 2 AND 3; REFERENCE 3

In accordance with the process of Example 1 except varying the time of the addition of n-octyl benzoate, each solid titanium trichloride was produced. In Examples 2 and 3, n-octyl benzoate was added when the solution was respectively heated to 70° C. or 95° C. (about 20% or about 55% of the solid titanium trichloride was precipitated). In Reference 3, n-octyl benzoate was added when the solution was heated at 95° C. for 90 minutes (100% of the solid titanium trichloride was precipitated).

In accordance with the process of Example 1 except using each violet solid titanium trichloride, each polymerization of propylene was carried out. The result is shown in Table 1.

EXAMPLES 4 AND 5

In accordance with the process of Example 3 except varying an amount of n-octyl benzoate, each solid titanium trichloride was produced. In Examples 4 and 5, the amount of n-octyl benzoate was respectively 18 mmol or 9 mmol.

In accordance with the process of Example 1 except using each solid titanium trichloride, each polymerization of propylene was carried out. The result is shown in Table 1.

TABLE 1

|        | CE (g-PP/g-Ti) | K (CE/HR · P$_{PPY}$) | II (%) | $\rho_B$ (g/cc) |
|--------|----------------|----------------------|--------|-----------------|
| Exp. 1 | 49,750         | 603                  | 97.2   | 0.41            |
| Exp. 2 | 51,150         | 620                  | 97.0   | 0.40            |
| Exp. 3 | 50,160         | 608                  | 97.0   | 0.41            |
| Exp. 4 | 48,260         | 585                  | 97.3   | 0.42            |
| Exp. 5 | 51,480         | 624                  | 96.8   | 0.40            |
| Ref. 1 | 46,370         | 562                  | 95.4   | 0.38            |
| Ref. 2 | 44,260         | 536                  | 96.6   | 0.40            |
| Ref. 3 | 44,800         | 543                  | 96.7   | 0.40            |

EXAMPLES 6 TO 10; REFERENCE 4 TO 6

In accordance with the process of Example 1 except using each ester shown in Table 2 instead of n-octyl benzoate, each solid titanium trichloride was produced.

In accordance with the process of Example 1 except using the resulting solid titanium trichloride, each polymerization of propylene was carried out. The result is shown in Table 2.

TABLE 2

|         | Ester            | CE (g-PP/g-Ti) | K (CE/HR · P$_{PPY}$) | II (%) | $\rho_B$ (g/cc) |
|---------|------------------|----------------|----------------------|--------|-----------------|
| Exp. 6  | n-butyl stearate | 49,170         | 596                  | 97.3   | 0.43            |
| Exp. 7  | n-butyl oleate   | 50,080         | 607                  | 96.9   | 0.40            |
| Exp. 8  | n-decyl caprate  | 48,180         | 584                  | 96.7   | 0.40            |
| Exp. 9  | n-butyl caprate  | 48,840         | 592                  | 96.8   | 0.40            |
| Exp. 10 | n-butyl caprylate| 48,350         | 586                  | 97.0   | 0.41            |
| Ref. 4  | methyl benzoate  | 42,980         | 521                  | 97.3   | 0.40            |
| Ref. 5  | ethyl benzoate   | 42,400         | 514                  | 97.4   | 0.40            |
| Ref. 6  | n-butyl acetate  | 38,610         | 468                  | 95.9   | 0.39            |

We claim:

1. In a process for producing a fine solid titanium trichloride suitable for use as a catalyst for polymerization of an α-olefin which comprises:
   (a) forming a homogeneous solution or mixture comprising a liquid titanium trichloride complex by reducing titanium tetrachloride with an organoaluminum compound of the formula AlR$_n^5$X$_{3-n}$ wherein R$^5$ represents a C$_1$-C$_{20}$ hydrocarbon moiety, n is a number of the value of 1 to 3 and X represents a halogen atom, in the presence of an ether of the formula R$^3$—O—R$^4$ wherein R$^3$ and R$^4$ are the same or different and respectively represent an alkyl or alkenyl group at −30° to 35° C.;
   (b) heating the homogeneous solution or mixture in the presence of Lewis acid at a temperature between 40° to 150° C., to cause a precipitation of solid titanium trichloride; and
   (c) separating said precipitate, an improvement characterized in that the said precipitation is carried out in the presence of a monocarboxylic acid ester having the formula of

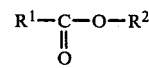

wherein R$^1$ and R$^2$ respectively represent a hydrocarbon moiety and total carbon atoms of R$^1$ and R$^2$ are 12 or more wherein said ester is added before precipitating a substantial amount of the solid titanium trichloride from the homogeneous solution or mixture.

2. A process for producing a solid titanium trichloride according to claim 1 wherein the ester has the formula wherein total carbon atoms of $R^1$ and $R^2$ are 12 to 21.

3. A process for producing a solid titanium trichloride according to claim 1 wherein said ester is selected from the group consisting of hexyl benzoate, octyl benzoate, decyl benzoate, phenyl benzoate, hexyl toluylate, octyl toluylate, decyl toluylate, phenyl toluylate, butyl ethylbenzoate, amyl ethylbenzoate, hexyl ethylbenzoate, octyl ethylbenzoate, decyl ethylbenzoate, phenyl ethylbenzoate, butyl trimethylbenzoate, amyl trimethylbenzoate, hexyl trimethylbenzoate, octyl trimethylbenzoate, decyl trimethylbenzoate, phenyl trimethylbenzoate, propyl propylbenzoate, butyl propylbenzoate, amyl propylbenzoate, hexyl propylbenzoate, octyl propylbenzoate, decyl propylbenzoate, phenyl propylbenzoate, octyl butyrate, decyl butyrate, octyl valerianate, decyl valerianate, phenyl valerianate, octyl caproate, decyl caproate, phenyl caproate, amyl caprylate, hexyl caprylate, octyl caprylate, phenyl caprylate, propyl caprate, butyl caprate, amyl caprate, hexyl caprate, octyl caprate, decyl caprate, phenyl caprate, propyl laurate, butyl laurate, amyl laurate, hexyl laurate, octyl laurate, phenyl laurate, propyl palmitate, butyl palmitate, hexyl palmitate, octyl palmitate, phenyl palmitate, ethyl stearate, propyl stearate, butyl stearate, hexyl stearate, octyl stearate, phenyl stearate ethyl oleate, butyl oleate, hexyl oleate, octyl oleate and phenyl oleate.

* * * * *